(12) United States Patent
Sherrets

(10) Patent No.: US 9,461,955 B1
(45) Date of Patent: Oct. 4, 2016

(54) TRANSMISSION OF INFORMATION DURING LOW-BANDWIDTH NETWORK SERVICE

(71) Applicant: GOOGLE INC., Mountain View, CA (US)

(72) Inventor: Doug Sherrets, San Francisco, CA (US)

(73) Assignee: Google Inc., Mountain View, CA (US)

( * ) Notice: Subject to any disclaimer, the term of this patent is extended or adjusted under 35 U.S.C. 154(b) by 695 days.

(21) Appl. No.: 13/794,759

(22) Filed: Mar. 11, 2013

(51) Int. Cl.
*H04L 12/58* (2006.01)
*H04L 29/08* (2006.01)
*G06F 15/16* (2006.01)

(52) U.S. Cl.
CPC ............... *H04L 51/32* (2013.01); *H04L 51/20* (2013.01); *H04L 67/306* (2013.01)

(58) Field of Classification Search
CPC .............................. H04L 67/306; H04L 51/20
USPC ......................................................... 709/206
See application file for complete search history.

(56) References Cited

U.S. PATENT DOCUMENTS

| 8,218,736 | B1* | 7/2012 | McClintock | H04M 1/642 379/88.12 |
| 2009/0310508 | A1* | 12/2009 | Ou | H04L 43/10 370/253 |
| 2013/0117381 | A1* | 5/2013 | Garcia | H04L 51/32 709/206 |
| 2014/0146676 | A1* | 5/2014 | Howes | H04L 47/2441 370/235 |

* cited by examiner

*Primary Examiner* — Suraj Joshi
(74) *Attorney, Agent, or Firm* — IP Spring

(57) ABSTRACT

Implementations disclose transmission features for devices during low-bandwidth conditions. In some implementations, a method includes determining that a bandwidth on a network satisfies or will satisfy a low-bandwidth threshold and restricts or will restrict transmission of one or more information messages between the user and one or more entities associated with the one or more information messages. The method modifies transmission of the one or more information messages between the user and the one or more entities based on one or more social relationships between the user and the one or more entities.

20 Claims, 6 Drawing Sheets

TRANSMISSION OF INFORMATION DURING LOW-BANDWIDTH NETWORK SERVICE

BACKGROUND

Electronic devices have become widespread and popular, especially portable devices such as cell phones, tablets, and other similar devices. Many devices include network functionality to allow transmission of data and messages over wireless, cell phone, and other networks. Devices are not only capable of enabling voice communication with friends, family, and other social contacts, but also allow other types of communication, including data and messages via text message protocols, emails, forums or newsgroups, social networking services, websites, or other forms, and in any of a variety of media types, including text, audio, video, images, etc.

SUMMARY

Implementations of the present application relate to providing information transmission features for devices during low-bandwidth conditions. In some implementations, a method includes determining that one or more information messages from one or more entities are being received by a user over a network. The method determines that a bandwidth on the network satisfies a low-bandwidth threshold. A notification is provided to the user to indicate the determination that the bandwidth satisfies the low-bandwidth threshold. Transmission of the one or more information messages is modified based on priorities assigned to the one or more information messages, where the priorities are based on one or more social relationships between the user and the one or more entities. In various implementations, modifying the transmission can include determining an order of transmitting the one or more information messages based on the relative priorities of the information messages, and/or adjusting an amount of time used in one or more attempts to transmit at least one of the one or more information messages, where the amount of time is based on the one or more social relationships. Some variations can provide a prompt to the user to subscribe to receive a future notification that will be output to indicate that at least one of the one or more information messages has been transmitted.

In some implementations, a method includes determining that a bandwidth on a network satisfies or will satisfy a low-bandwidth threshold and restricts or will restrict transmission of one or more information messages between the user and one or more entities associated with the one or more information messages. The method modifies transmission of the one or more information messages between the user and the one or more entities based on one or more social relationships between the user and the one or more entities.

Various implementations and examples of the above method are described. Modifying the transmission of the information messages can include determining a priority for each information message based on a social relationship between the user and the entity associated with each information message. A subset of the information messages having lowest priorities can be excluded from transmission, and/or an order of transmitting the one or more information messages can be determined based on the relative priorities of the information messages. Determining a priority for each information message can be based on whether each information message is in response to a previous information message provided by the user over the network, and/or based on a geographical location of the source of each information message. In some implementations, the entities can include one or more target entities and/or multiple source entities, where the device can send and/or receive the information messages to and/or from these entities.

Modifying transmission of the information messages can include adjusting an amount of time used in one or more attempts to send or receive at least one of the one or more information messages, where the amount of time is based on the one or more social relationships. The amount of time can also or alternatively be based on a geographical location of the device. In some implementations, the entities can include one or more users of a social networking service that is used by the user of the device, where the social relationships can be determined based on data from the social networking service. A notification can be provided to the user to indicate that determination that the bandwidth satisfies or will satisfy the low-bandwidth threshold. A prompt can be provided for a user to subscribe to receive a future notification that can indicate that at least a substantial portion of at least one of the information messages has been transmitted. The method can include scheduling a transmission of an information message between the device and the network at a time prior to a future time when it is known that the low-bandwidth threshold is likely to be satisfied on the network. For example, the time that the low-bandwidth threshold is likely to be satisfied can be known based on an accessible calendar of the user indicating events or locations to be attended by the user and indicating associated times with the events or locations.

In some implementations, a device comprises a storage component and at least one processor accessing the storage component and operative to perform operations. The operations include determining that a bandwidth on a network satisfies or will satisfy a low-bandwidth threshold, where the bandwidth restricts or will restrict transmission of one or more information messages between the user and one or more entities over the network. The operations modify transmission of the one or more information messages between the user and the one or more entities based on one or more social relationships between the user and the one or more entities associated with the one or more information messages. In various implementations of the device, the entities can include multiple source entities, where the device is operative to receive one or more information messages from each source entity. Modifying the transmission of the information messages can include determining a priority for each information message based on a social relationship between the user and the source entity associated with each information message. The method can determining an order of receiving the information messages based on the relative priorities of the information messages.

DETAILED DESCRIPTION

Figure 1:
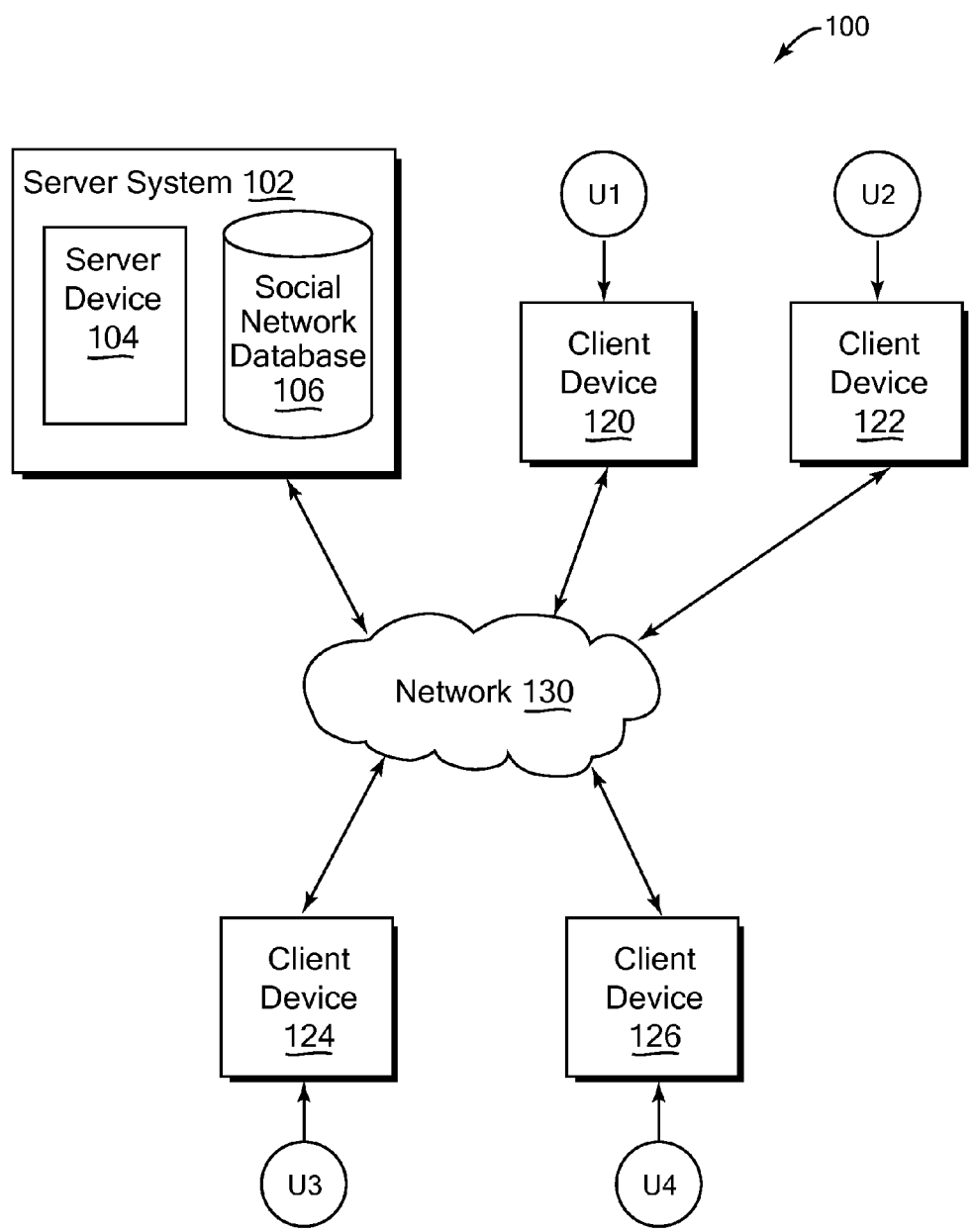
FIG. 1 is a block diagram of an example network environment which may be used for one or more implementations described herein.

One or more implementations described herein relate to providing information transmission features to devices during low-bandwidth conditions. Various implementations can determine that a low-bandwidth threshold has been satisfied between a user device and a communication network, and modify the sending and/or receiving of information messages to and from the user and one or more entities associated with the information messages. The modification can be based at least in part on social relationships between the user and the entities.

With the widespread use of electronic devices, information transmission between a device and a network can sometimes be intermittent or delayed. For example, a large number of device users simultaneously using a limited set of channels in a network can cause significant delays in communication. In some examples, events having a large number of users attending, such as concerts, sports games, or conferences, may have many users simultaneously trying to use the same limited network channels available at that location, causing delays and periods of low or no service for transmission of data to and from their devices. Disclosed features allow a user using a device during low-bandwidth conditions to more quickly send and receive important information that the user is most interested in, while less important information can be excluded or delayed from transmission to reduce bandwidth requirements.

In some implementations, a device can determine that one or more information messages are being sent from or received by a user from one or more entities. The user device can be any electronic device, such as a laptop computer, desktop computer, cell phone, tablet, server, etc. The entities, such as other users or organizations, can be associated with devices connected to the network. Some implementations determine that a low-bandwidth threshold has been satisfied (e.g., a low-bandwidth threshold condition or "low service") exists on the network between the device and the entity devices, where the low-bandwidth threshold condition limits transmission of information messages from and to the device, e.g., a bandwidth less than a threshold. In some examples, the low-bandwidth threshold condition can occur at a sports game or other large-audience event or location at which many users are trying to send and receive messages using their devices.

The device can modify transmission of the information messages to and from the user of the device based on one or more social relationships between the user and entities associated with the information messages. For example, the device can assign priorities to the information messages based on a social connection or affinity of an entity with the device user. In some implementations, the device can order the transmission of information messages based on these priorities. For example, messages sent out by the user can be given higher priority, as can received messages from close friends and responses to the user's previous posts. Messages received from (or intended for) less known users can be given lower priority, and these messages may be excluded from transmission to or from the device or delayed until bandwidth conditions improve. Some implementations can adjust the time that the device spends trying to receive messages based on social relationships, such as a longer time spent in attempting to receive messages from close friends as opposed to messages from less known entities. Furthermore, priorities can be influenced based on whether an entity is close by geographically to the user device (e.g., located at the same event), and/or based on other factors including predetermined user preferences.

In some implementations, the device can provide a notification which can be viewed and/or otherwise sensed by the user to indicate the low-bandwidth threshold condition. Furthermore, some implementations can provide a prompt on the user device to allow the user to subscribe to receive a future notification that will be output by the device and indicates that a particular information message (or any message having a high priority) has been transmitted to or from the device. Some implementations can allow scheduling a transmission of an information message between the user device and the network prior to a future time when it is known that future low-bandwidth threshold condition will occur between the device and the network, where the future time is known by examining calendar information accessible to the device.

FIG. 1 illustrates a block diagram of an example network environment 100, which may be used in some implementations for one or more features described herein. In some implementations, network environment 100 includes one or more server systems, such as server system 102 in the example of FIG. 1. Server system 102 can communicate with a network 130, for example. Server system 102 can include a server device 104 and a social network database 106 or other storage device. Network environment 100 also can include one or more client devices, such as client devices 120, 122, 124, and 126, which may communicate with each other via network 130 and server system 102. Network 130 can be any type of communication network, including one or more of the Internet, cell phone networks, local area networks (LAN), wireless networks, switch or hub connections, etc. In other implementations, network environment 100 may not have all of the components shown and/or may have other elements including other types of elements instead of, or in addition to, those described herein.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130.

There may be any number of client devices. Each client device 120-126 can be any type of electronic device, such as a computer system, desktop computer, portable device, cell phone, smart phone, tablet computer, virtual reality or augmented reality head-mounted display devices (e.g., goggles or glasses), television, TV set top box or entertainment device, personal digital assistant (PDA), media player, game device, household or workplace appliance, server, embedded device, etc.

In various implementations, users U1, U2, U3, and U4 may communicate with the server system 102 via respective client devices 120, 122, 124, and 126 as well as communicate with each other. For example, each user can receive messages and notifications via a social network service implemented by network system 100. In one example, users U1, U2, U3, and U4 may interact with each other via the social network service, where respective client devices 120, 122, 124, and 126 transmit messages and data to one or more server systems such as system 102, and the server system 102 provides appropriate data to the client devices such that each client device can receive shared content uploaded to the social network service via the server system 102. One or more users can each be associated with multiple client devices in some implementations.

A social networking service provided by system 10 can include any system allowing users to perform a variety of types of communications, form links and associations, upload, post, view, and download shared content, and/or perform other socially-related functions. For example, the social network service can allow a user to send messages to particular or multiple other users, form social links in the form of associations to other users within the social network system, group other users in user lists, friends lists, or other user groups, post or send content including text, images (such as photos), video sequences, audio sequences or recordings, or other types of content for access by designated sets of users of the social network service, send multimedia information and other information to other users of the social network service, participate in live video, audio, and/or text chat with other users of the service, etc. Some implementations can provide one or more "activity streams" of information for a user, which can display information and content posted by the user as well as information and content posted by other users of the social networking system. For example, in some implementations a user can instruct the system that the content from other particular designated users be included in the user's activity stream, while content from other users is not included in that activity stream.

As used herein, the term "social network service" can include a software and/or hardware system that facilitates user interactions, and can include a service implemented on a network system. A "social link" is any link between multiple users that allows these users to more easily communicate, view and find statuses of the other users, and/or otherwise relay information between each other. For example, adding another user to a first user's group of known users is adding a social link between these users. In some implementations, a "user" can include one or more programs or virtual entities, as well as persons that interface with the system or network.

Furthermore, a user can designate one or more user groups, such as "friends lists," family lists, occupation lists, etc., to allow users in the designated user groups to access or receive content and other information associated with the user on the social networking service. A user's user groups each specify one or more users of the social network service with which the user has a social link. A user (or the social networking service, in some implementations) can add users to particular user groups as desired and can designate the amount of access and/or sharing of content or data with each user group. For example, the user can designate that the users in one user group can access content (e.g., receive and view the content on their client devices) which the user posts on the social networking service, such as text or audio messages and graphical images. Or, the user can designate that the users in a different user group can access user profile information of the user, such as identifying information, opinions, hobbies, interests, etc. In some implementations, the access of users to user information can be designated in terms of larger groups, such as a "public" setting designating all the users of the social network service, "acquaintances" to indicate friends of friends, or a different privacy level setting. Some implementations of a social networking service allow the user to designate groups of users including extended or additional social linked levels (degrees of separation) of users. A user may also be able to designate other groups or sets of users regardless of whether those other users are in the user's own listed groups.

A social networking interface, including display of content and messages, privacy settings, notifications, and other features described herein, can be displayed using software on the client device, such as application software or client software in communication with the server system. The interface can be displayed on an output device of the client device, such as a display screen (touchscreen, etc.). For example, in some implementations the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

Some implementations can provide one or more features related to information transmissions with one or more other users, companies, organizations, software agents or programs, etc., all referred to as "entities" herein. For example, other entities attempting communication with a user can use associated devices having connections to the network 130 to send and receive information using functions of a service, such as the social networking service described above, and related to one or more features herein.

Other implementations can use other forms of devices, systems and services instead of the social networking systems and services described above. For example, users accessing any type of communications network, computer network, or network/storage service can make use of features described herein. Some implementations can provide features described herein on systems such as one or more computer systems or electronic devices that are disconnected from and/or intermittently connected to computer networks.

Figure 2:
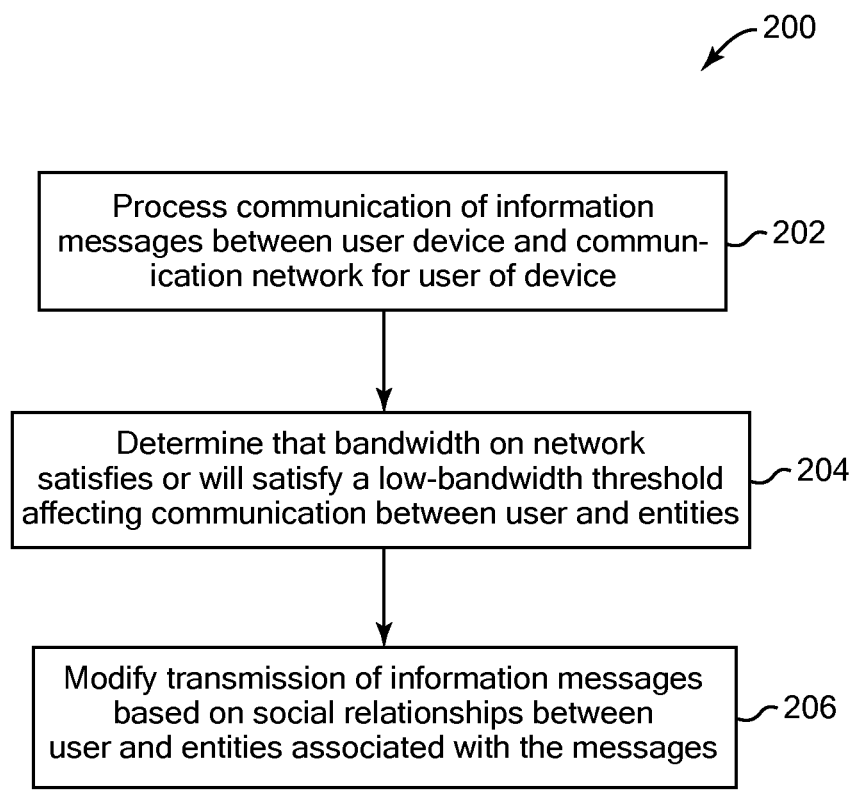
FIG. 2 is a flow diagram illustrating an example method for providing transmission of information between a user's device and other entities during low-bandwidth network service, according to some implementations.

FIG. 2 is a flow diagram illustrating one example of a method 200 for providing transmission of information between a user and one or more other entities during low-bandwidth network service, according to some implementations. Method 200 (and method 300, below) can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The methods 200 and/or 300 can be performed as part of or component of an application running on a server device or client device, or as a separate application or software running in conjunction with other applications and operating system. For example, the method 200 can be implemented by a separate application program or other program running on a device, or can be implemented within an existing program running on the device to provide communication functions.

In block 202 of method 200, the method processes (normal) transmission of information messages between a device and a communication network for a user of the device. An "information message" can be data provided from one entity to another entity, and can take a variety of different forms. In some implementations, the messages can include text data, image data, audio data, and/or other types of data. For example, text postings on a social network service from one user can be an information message to a second user if the second user can view that posting. Similarly, an image or video posting can be an information message, and/or an audio track or posting. An information message can include an audio and/or image/video phone call, in which, for example, voice data is captured from users, digitized, and transmitted over the network between devices. In some implementations, an information message can be or include data for one or more notifications, commands, ratings, comments, or messages. Some implementations can allow information messages including telephone call data, a text message or email, an image (or a collection of multiple images), video data, a data file (of audio data, video data, text data, machine code, etc.), game-related data, etc.

"Transmitting" an information message (e.g., a "transmitted" information message) herein refers both to a device sending information to other devices and entities via the network, and/or the device receiving information from one or more other devices and entities via the network. Thus an information message can be an outgoing message sent by the device to the network, or an incoming message received by the device from the network. For example, one or more of the information messages can be in the process of queuing, or have previously queued, within one or more storage buffers of the device to then be sent from the device to the communication network for delivery to one or more target devices connected to the communication network and associated with one or more target entities. One or more of the information messages can be in the process of being, or about to be, received by the device from the communication network and from one or more associated entities. In some implementations, an information message can be continually sent or received over the network with no predetermined end or cut-off point, such as a streaming information message providing data capturing an open-ended event or occurrence. Under normal transmission conditions, information messages can be transmitted between the client device and the network with standard delays for typical use. In some implementations, each of the information messages has its own designated target destination connected to the network, such as a target network address provided for a device, entity, server, website, social networking site, message board, etc.

In block 204, the method determines that a bandwidth on the network satisfies or will satisfy a low-bandwidth threshold that will affect transmission of one or more information messages between the user and one or more entities over the network. For example, the bandwidth may be under a predetermined low-bandwidth threshold that indicates a minimum desired bandwidth for the current (or future) data transmissions to and/or from the user device. In some examples, the bandwidth can be detected using an application or other program on a device that can process data traffic between the user device and the network and detect whether data transmission is slowing and available bandwidth for transmission is decreasing. In some implementations, the method can detect when particular communication channels are open, how many are open, how long an acknowledgment or response takes to be received after sending out a message, etc. Lower bandwidth conditions can be caused by any of many possible factors, including a large number of devices attempting to transmit information over the same limited channels at the same time, malfunctions in a network, server, or client device, etc. In the described block 204, the method can determine if the low-bandwidth threshold is satisfied and a low-bandwidth threshold condition therefore exists by detecting bandwidth below the predetermined threshold or below some other predetermined bandwidth criteria that indicate a low-bandwidth threshold condition. Some implementations can use an adjustable or dynamic low-bandwidth threshold that can vary based upon one or more current transmission conditions and/or network conditions, e.g., based on the number of messages desired to be simultaneously transmitted, the number of entities or devices using the network, etc.

In block 206, the method modifies transmission of one or more information messages between the device and the network at least based on social relationships between the user of the device and one or more entities associated with the information messages. As described above, the entities can be other users, organizations, companies, or other entities. The modification of the transmission of information messages can include any of a variety of actions or adjustments which can, for example, assist in the transmission of one of more of the information messages during the low bandwidth condition. For example, the modification can cause one or more of the information message to be transmitted faster than it would otherwise, or in some cases can cause one or more of the information messages to be transmitted in whole rather than discarded or partially transmitted. In some implementations, the modification of transmission can be performed at the user device to send or receive messages. In other implementations, the modification can be performed partially or completely by one or more other devices on the network, such as a server or other type of device.

In various implementations, the modification can include, for example, ordering the information messages based on social relationships between user and entities. In some implementations, the social relationships of the user can be used to infer the importance of messages to and from the user and/or to determine transmission priorities which are assigned to the messages. In some examples, a social affinity of the communicating entity to the user can determine how important is that entity's message, based on known previous social links or connections between user and entity, frequency of transmission of information messages to and from the entity, ratings of the user for the entity's messages, and other social factors. For example, the most important messages to the user can be ordered first and given highest priority to be sent and/or received by the user device. Less important messages can, for example, be excluded from transmission, or delayed to be transmitted after the more important messages and/or when bandwidth conditions improve. In some implementations, the modification can also include other actions or adjustments, such as adjusting an amount of time that the method attempts to send or receive at least one of the information messages, where the amount of time is based on the one or more social relationships. Some examples of modification of transmission are described in greater detail with respect to FIG. 3.

The blocks described above can be implemented on different types of systems in different implementations. In some implementations, all the blocks can be implemented on a particular system, such as a portable device, desktop computer, or server device. In other implementations, some of the blocks can be implemented on one system and other blocks implemented on a different system. In some examples, the determination of whether the bandwidth satisfies a low-bandwidth threshold can be performed by a first device, such as a desktop computer, server device, or other device, while modification of the transmission of messages can be performed at a different, second device such as a portable device that can receive information from the first device over a network, or at a server device.

Figure 3:
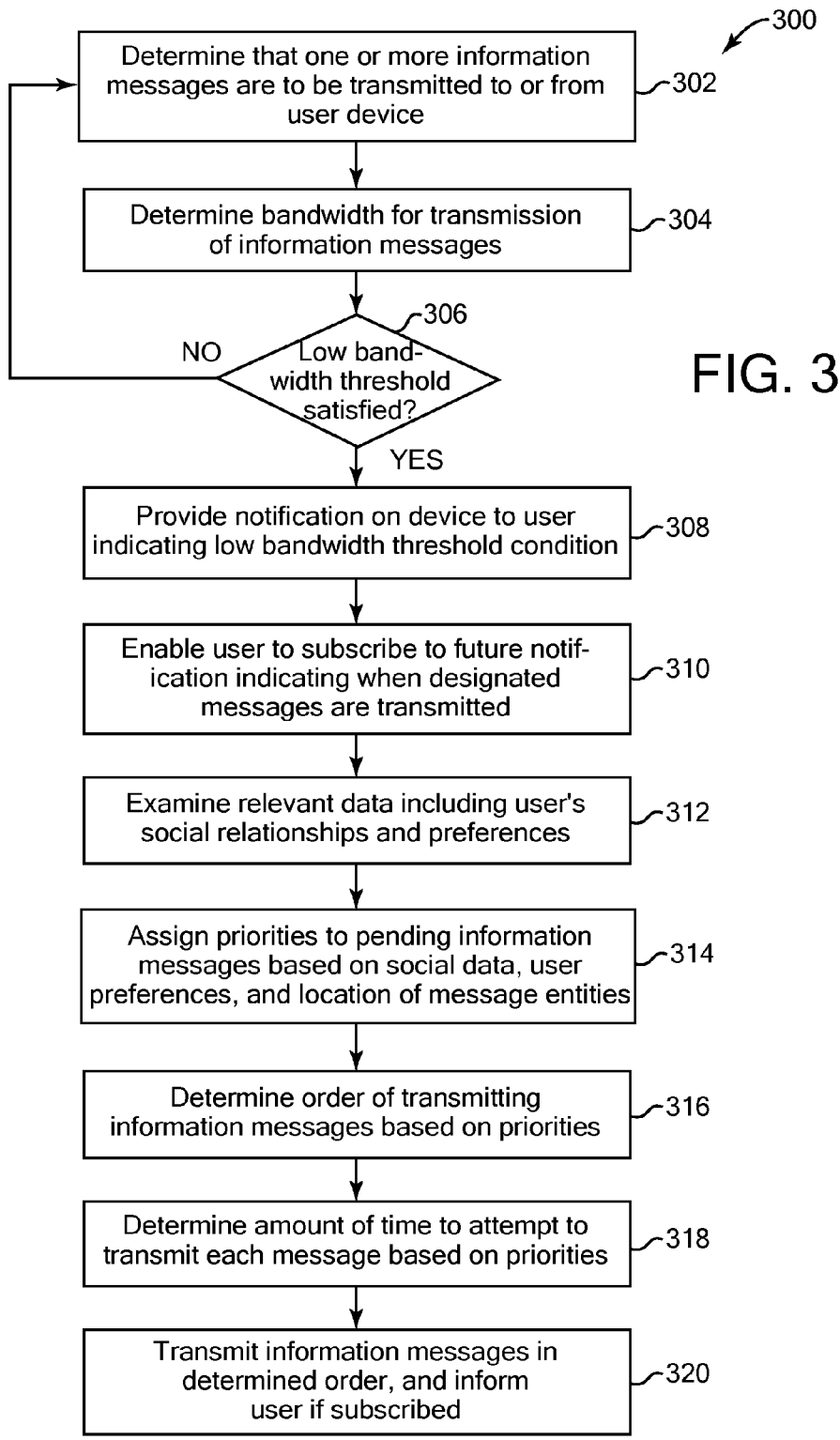
FIG. 3 is a flow diagram illustrating example implementations of the method of FIG. 2, according to some implementations.

FIG. 3 is a flow diagram illustrating an example implementation of a method 300 for providing transmission of information between a user device and other devices and/or entities during low-bandwidth network service. Similarly, to method 200, method 300 can be implemented on one or more client devices, and/or on a server device.

In block 302, the method detects that one or more information messages are being transmitted, or going to be transmitted, to or from a device, which is referred to as a "user device" for convenience herein. The user device has a "device user" operating the device. In some cases, the information messages include messages ready to be sent from the user device, and/or ready to be transmitted to the user device. The information messages can be any data from particular entities, such as one or more postings, email, social network user content, comments, ratings, etc., and can be one or more data types, such as text or symbols, images, video clips or segments, audio clips or files, commands, notifications, signals, or other type of data. In some implementations, the information messages can include data or signals indicating that one or more actions by an entity associated with a device have occurred with respect to the device, such as data indicating presses of device-connected physical controls such as buttons, dials, knobs, wheels, switches, touchpads, joysticks, or other controls, selection of displayed buttons, icons, links, or other selectable displayed objects, input of commands input to one or more applications or other programs running on the device, input or selection of operating system commands or functions, etc. In some implementations, information messages can be queued in one or more buffers of a device in preparation for transmission over the network. In some implementations, each of the information messages has its own designated target destination connected to the network, such as a target network address provided for a device, entity, server, website, social networking site, message board, etc.

In some cases, the information messages include pending messages that are ready to be transmitted, or are in the process of being transmitted, to the user (as a target entity) and/or the user device (as a target device) from one or more source devices and/or source entities linked to the network. Information messages can be originated by one or more source entities, which can be users, companies, organizations, software agents or programs, and/or other originators which are making use of one or more linked devices to send the messages to the network and/or to the user device. In some implementations, these messages can include content provided by a website, publisher, other users, software or firmware updates, commands for applicants running on the user's device, status updates from companies, organizations, clubs, etc.

In some cases, the information messages include pending messages that are ready to be transmitted, or are in the process of being transmitted, from the user device as a source device to one or more target devices and/or target entities linked to the network (e.g., destination devices or destination entities). The messages can be originated by the device user and can include emails to target entities using the target devices, postings or other content for upload to a social networking service, website or other network address, software or firmware updates, commands or signals for applications running on a remote server, etc.

In block 304, the current bandwidth is determined for the transmission of the information messages found in block 302. This bandwidth detection can include detecting and/or processing data traffic between the user device and the network for the information messages, detecting the current rate of data transmission, detecting whether communication channels are open, detecting response times, etc. In some implementations, the method can predict whether future transmission of information messages is likely to suffer from a low-bandwidth threshold condition. For example, the method can examine an available calendar, schedule, and/or other information related to the user's upcoming activities and/or data transmission and stored in accessible storage of the user device or of another connected device (via a network or other connection). If, for example, the device user's calendar indicates that the user will be attending a crowded event at a particular day and time, such as a sporting event, performance, presentation, conference, etc., then the method can predict that a low-bandwidth threshold condition will exist at that day and time for the duration of the event and, in some examples, a predetermined amount of time before and after the event. In such cases, the information messages determined for transmission in block 302 can be future information messages. In some implementations, the future information messages can be messages such as postings or other content that the device user regularly sends out and which can be predicted to be sent at particular future times. The determined future information messages can also include content or other information that the device user regularly receives at the user device, such as daily or weekly content or notifications (e.g., push notifications) received from news websites and other information sources, RSS feeds, email subscriptions, other users, a social networking service, etc. Some implementations can prompt the device user to ask if the user knows of any future messages that he or she will want to send out from, or will want to receive at, the user device at particular times or dates.

In block 306, the method checks whether a bandwidth on the network satisfies or will satisfy a low-bandwidth threshold, e.g., whether a low-bandwidth threshold condition exists (or will exist) for the transmitting information messages detected in block 302. As described above for FIG. 2, a low-bandwidth threshold condition can be detected in various ways in various implementations, including detecting bandwidth below the predetermined low-bandwidth threshold. If trying to predict whether low bandwidth will occur for future transmission of information messages, then other factors can be examined, such as location of the user at particular times, events, or other factors indicating that the low-bandwidth threshold is likely to be satisfied at those future times, e.g., a low bandwidth condition is likely to exist for information message transmissions at those future times. For example, in some implementations, several conditions can be assigned weights, such that if a high enough score (e.g., over a predetermined threshold score) is determined for a particular future time, the method predicts such low bandwidth will occur at that time. Such conditions can include the predicted location of the user (e.g., at an event or in a crowded area at particular times), the likelihood of other events that may cause high network activity, the types of events (e.g., checking if the user will be at an event at which more people are likely to transmit information, such as at a news conference as opposed to a music concert or symphony), etc. In some implementations, predictive techniques can be used or combined to provide predictions for future low-bandwidth threshold conditions at the user device. For example, the method can retrieve data over the network from accessible information sources to determine how many people will be attending a particular event, what the history of bandwidth conditions were at previous similar events, and/or to learn of other factors that can influence transmission bandwidth for devices, and can then make a prediction based on these factors and based on the likely location of the user at particular future times based on previous, regular user movement patterns or calendar/schedule information associated with the user.

If a low-bandwidth threshold is not found to be satisfied in block 306 (e.g., no low-bandwidth threshold condition exists for message transmission), the method returns to block 302 to process transmission of information for the device. If a low-bandwidth threshold has been determined to be satisfied or reliably be satisfied in the future, then the method can continue to block 308. In block 308, some implementations can provide a notification on the user device to the device user, where the notification indicates the determination that the bandwidth satisfies the low-bandwidth threshold and/or an occurrence of low bandwidth. This notification can inform the device user that message transmission will be delayed or interrupted due to the lower bandwidth. In some implementations, the notification can include a list of pending, currently communicating, and/or scheduled information messages that will be delayed or interrupted. The notification can be any form(s) of output, such as a visual notification displayed on a display screen of the device, an audio notification, a haptic notification (e.g., vibration or other physical forces), etc. In some implementations or contexts, the notification can be output upon receiving a user request or command to display the information, or at predetermined times or in response to predetermined events as specified by the user and/or entity. The information can be displayed on multiple devices associated with the user, and in different applications or interfaces such as a cell phone web browser, a social networking service application, or other interface.

In block 310, some implementations can enable a device user to subscribe to a future notification indicating that at least a substantial portion of one or more of the delayed or interrupted information messages have been transmitted. For example, a prompt be output to the user on the device. This prompt can be provided with the notification of block 308 in some implementations, or can be provided separately and/or independently of the notification. If the user chooses to subscribe, then the method can inform the user when one or more particular messages have completed being transmitted, e.g., outgoing messages have completed being sent out from the user device, and/or incoming messages have completed or substantially been received by the user device (e.g., over a predetermined percentage of the message data transmitted). In some implementations, the user can be allowed to subscribe to all messages that are currently in the process of being transmitted or are about to be transmitted. Some implementations can allow a user to choose as to which messages will be subscribed to and cause a future notification to be output. For example, a user can subscribe to a notification for messages from particular users or other entities, while not subscribing to a notification for messages sent out by the user or messages received by particular other entities. Or, the user can subscribe to be notified when messages sent to particular entities are completely transmitted. In some implementations, a list of categories of different types of entities can be presented from which the user can select to indicate categories of the desired entities that will cause notifications to be output for completed message transmissions to or from the desired entities. For example, a list of categories such as "friends," "family," "advertiser," "workplace contacts," etc. can be displayed, and the user can select which categories of entities for which he or she wants to be notified after information messages to or from those categories of entities have finished transmitting. Some examples of notification subscribing options are described below with reference to FIG. 5.

In block 312, the method can examine relevant data including data describing the user's social relationships and preferences. This data can allow the method to determine priorities for the pending information messages that have been (or will be) delayed or interrupted during the determined low bandwidth. For example, this relevant data can include social data describing the social relationships of the user, from which the method can determine which entities have more importance for the user. In some examples, the social data can be information about the user's social contacts within an online environment such as a social networking service. For example, such social data can describe the user groups that the user has formed, such as lists of friends, family, acquaintances, contacts, co-workers, and other users using the social network service with which the user has established social links. The social data may also in some implementations indicate which linked entities the user communicates with most often and/or least often. Furthermore, the social data can indicate whether the user has posted any messages on the social network service, whether any other users in the user's groups have posted any messages on the service, and/or whether any responses to the user's post or other users' posts have been provided by other users or entities.

In some implementations, some or all of the examined social data can be stored on and retrieved from storage on the user device, and block 312 can be implemented on the user device. For example, the user device can download and store and update social data pertinent to the user from a social network service periodically over time during normal device operation when communicating with the social networking service. Social data can in some implementations be similarly obtained and stored locally from other sources, such as websites or other online sources. In other implementations, the social data can be stored on and retrieved from a device remotely connected to the user device over the network, such as one or more server devices which can implement block 312. In some examples, the method can look up information about a target entity by examining address information of the entity in an available directory, such as a local or online phone directory. In some implementations, the social data can be derived from operations of the user device, such as previous transmissions sent or received by the device that have been logged (e.g., phone calls, emails, text messages, application messages, etc.). Such device transmissions can be used to determine which entities are communicated with most often, which entities are preferred by the user for transmissions, etc.

Other relevant data can also be examined. In some implementations, for example, data describing the current location of the user and locations of any entities associated with pending information messages can be examined, if available. For example, the current locations of communicating entities may be available on a social networking site or websites of the entities, or within data that has already been received at the user device. In some implementations, other relevant data to be examined include user preferences. Such user preferences can be stored locally on storage of the device and/or an online site or service, and can include user-designated priorities or preferences as to which entities are more important to the user and the priorities of information messages and/or related characteristics. For example, preferences can be offered to allow the user to designate how important particular factors (such as social affinity or relationships) are to determining message priorities, how and when to receive reminders and notifications, subscription options, etc. Some examples of preferences are described below with reference to FIG. 5.

Some implementations can provide an option for the user and/or each other entity connected to the network to provide consent to allowing any information specific to that entity (or particular designated types of information) to be retrieved and examined for use in methods described herein. For such entities that do not provide consent, social network data, physical location information, calendar information, or other entity-specific information would not be examined or available for use in method 200 or 300, for example. In some implementations, only particular types of information about an entity can be examined by the method based on user- or system-specified criteria and preferences.

In block 314, a priority is assigned to each of the pending information messages that need to be transmitted between the user device and the communication network. The priorities are assigned, at least in part, based on the relevant data examined in block 316, including social data and user preferences and/or any other data. For example, priorities can be assigned based on the entities sending and/or receiving the messages and their social relationship to the user. In some implementations the source entities of messages being received, and/or target entities for messages are being sent, can be determined from information in the pending messages, such as header information.

In some implementations, information messages can be categorized into different types or categories, where each type or category has an assigned predetermined priority. The pending messages can be examined to determine in which type or category each messages fits, and the corresponding priority is assigned. For example, the different types can include different categories of entities, where messages to or from family can be one type, to or from friends can be another type, and to or from anonymous users can be another type. Types of messages can in some implementations also be designated for individual entities, such as messages from one particular user of a social networking service being one type and messages from another user of the service being another type. Or, messages to and from users of a social networking service can be one type, messages to and from email users another type, and messages to and from users of message boards on websites be another type. Other characteristics of messages can also be used to distinguish message types. For example, messages can be organized into different types based on a physical or geographical location of the devices and/or entities sending or receiving the messages. In another example, messages can be organized into different types based on a type of device sending the message, such as a cell phone, desktop computer, server, etc.

In one non-limiting specific scenario, the pending information messages can include a posting to be sent out by the user device, a posting to be received at the user device from an entity, and an advertisement to be received at the user device from a company. The examined relevant data can include social data that indicates that the posting being received from the entity is from one of the user's close friends on a social networking service. The examined relevant data can also include stored user preferences input on the user device that indicate, in this example, that the user prefers to prioritize sending out his or her own messages over receiving messages at the user device. Thus, block 314 can assign the highest priority to the posting to be sent out, the next highest priority to the message being received from the entity, and the lowest priority to the advertisement message. In another example scenario, the user may have set preferences indicating that messages (including advertisements) from particular companies are given a higher priority, in which case the advertisement message may be a higher priority than in the previous scenario.

In some implementations, priorities can also be assigned based on various other characteristics of the entities associated with the messages, with the user or user device, and/or with the messages themselves. In some implementations, location data can be used, at least in part, to determine priorities. For example, if the user device is near an entity associated with one of the pending information messages and is located much further from an entity of another pending message, then the closer entity can be assigned higher priority. This can allow users who are both at the same event, for example, to be able to transmit messages between each other with higher priority, since they may be trying to meet up, converse about the event, etc. In another example, priorities can be based at least in part on data sizes of the information messages (e.g., in bytes or other measure). For example, much shorter information messages can be assigned higher priorities to allow those messages to be transmitted in relatively short time compared to messages of much greater size.

Some implementations can include multiple factors in the determination of priorities. For example, various factors can be assigned weights and a score determined to determine the priority. For example, the social relationship of a pending message's entity with the user can be assigned a higher weight if the user prefers such weighting, while location, size, user preferences, and other factors can be assigned particular weights designated by the user in user preferences. In some implementations, each factor can be multiplied by its weighting factor and added together to achieve a priority score for each information message.

In block 316, an order of communicating the information messages is determined based on the priorities assigned in block 314. Thus, in the example scenario described above with respect to block 314, the posting to be sent by the user device is designated to be sent first, followed by receiving the message at the user device from the user's friend, following by receiving the advertisement message at the user device. In some implementations, if sufficient bandwidth is available on the communication channel(s) between user device and the network (e.g., over a predetermined threshold amount of bandwidth), then multiple ones of the pending messages can be transmitted simultaneously at least during a part of their transmissions. For example, the messages to be transmitted simultaneously can be selected based on the assigned priorities, and/or some messages can be allocated more bandwidth than others that are allocated less bandwidth based on the determined order and/or priorities.

In block 318, an amount of time to attempt (e.g., attempt duration) to transmit (e.g., send or receive) each information message is determined based on the priorities assigned in block 316. For example, in some implementations, the method can attempt to send or receive a particular information message for a longer period of time if the message has a higher priority, before the method cancels the transmission attempt. For example, the method may attempt to send or receive a highest priority message for 10 minutes before cancelling the transmission attempt if data transmission cannot be achieved. Similarly, the method can attempt to send or receive a middle-range priority message for 5 minutes before cancelling, and attempt to send or receive a low priority message for 3 minutes before cancelling. Some implementations can allow the user to adjust or create these settings, e.g., edit or create desired ranges of priorities and the attempt duration assigned to each range of priorities. In some implementations, the method can extend the time in attempting to transmit a message past the predetermined attempt duration if some data of the message has been able to be transmitted, where the extended time can also be based on the assigned priorities and/or user preferences in some example implementations. In various implementations, the user device or a linked device (e.g., server device) can attempt to transmit information messages over the network to and from a user device for periods of time as described above.

In block 320, the information messages are transmitted between the device and the communication network (e.g., between the device and one or more other devices connected to the network) based on the determined order and time of attempt determined in blocks 316 and 318. In some implementations, one or more of the information messages are data files or other self-contained amounts of data, which are completely transmitted when all of the data of the message has been received by a device receiving that message. In some examples, a received information message can be displayed on the user device for the user if appropriate. For example, postings from users of a social networking service received by the device can be displayed in an activity stream of the user in the social networking service interface. Received information messages can be displayed and/or utilized by any appropriate application and/or output component of the user device.

Some information messages can be sent or received by the user device as streaming data, in which a sufficient amount of data is buffered at the receiving device before presentable portions of the data (such as video, images, or audio) are output to the associated user or other entity by the receiving device. In some implementations, a streaming information message can be considered complete when all the streaming data has been transmitted, or in some implementations after a predetermined percentage or portion of all the data in the stream has been received. In some cases, streaming information messages are open-ended and have no designated or predetermined end of data, such as a live video and/or audio broadcast, in which case the streaming message is continually checked to see if the stream can be maintained without interruption or delay. In some implementations, an open-ended message can be considered fully transmitted at every predetermined time interval or data amount to allow other, lower-priority messages to be transmitted periodically.

In some implementations, each pending information message is selected and transmitted at its turn in the order, where the method attempts to transmit the selected message (e.g., send the message from or to the user device, or receive the message at or from the user device) for the determined amount of time. Some implementations can cancel the attempted transmission of a selected message if the attempt time expires, and select the next message in the order to attempt to transmit. In other implementations, after attempt time expires, the method can re-attempt to transmit the same message after a predetermined amount of time passes. The method does not transmit (e.g., delays or cancels) or slows down transmission of the pending unselected and lower-priority messages between the user device and the network. In some implementations, unselected information messages having lower priority can be excluded from any attempt at transmission. For example, these lower-priority messages can be delayed from being transmitted to or from the device until at later time when bandwidth between device and network increases and improves (if the message is still available to be transmitted at that later time). Or, one or more of the lower-priority pending messages can be cancelled from transmission, e.g., with a notification to the user and option for the user to select to re-send or re-receive the cancelled messages, if possible. Some implementations can slow down transmission of one or more lower-priority messages such that transmission of the selected highest priority message is not impeded. In some embodiments or cases, the method performs the transmitting, delaying, canceling, and/or slowing down of appropriate messages, and/or the method can send appropriate signals to one or more devices on the network to enable one or more of these actions.

Furthermore, if the user is subscribed to any of the information messages in block 310, after such a message has been transmitted successfully the method can cause a notification to be output by the user device. As described above, the notification can be visual, audio, and/or other form of output. In some implementations, if the subscribed message is not able to be transmitted after the attempt duration has expired, the subscribed user can be informed of the failed attempt. In some implementations, the notification can be provided to a user after a portion of a subscribed information message has been transmitted to or from the device. For example, the notification can be provided on the device to indicate that an information message has been transmitted, and/or at least a substantial portion of an information message has been transmitted (e.g., over a predetermined percentage of the message data). In one example, the notification can be provided on the device to indicate that a sufficient amount of an information message has been received by the device to be output, or begin being output, by the device. In an example, a user device can receive video file content from a source device over the network, and the notification can be provided to the user after a sufficient amount of the video data is received to begin displaying and playing the video content on the receiving device.

In some implementations, a server such as server system 102 can determine when sufficient bandwidth becomes available on the communication channel between user device and the server via the network to allow the sending of a notification to the device, and if sufficient bandwidth becomes available, the server can send or "push" a notification of successful transmission of an information message to the user's device for output to the user. For example, a notification indicator can be sent by the server to the device such that when the device receives the indicator, it knows that the message has been completely received by the server and that a notification is to be output by the device.

Variations of methods 200 and 300 can be implemented. For example, one or more blocks can be performed in a different order than shown in FIG. 3, and/or simultaneously (partially or completely) where appropriate. In some implementations, blocks can occur multiple times, in a different order, and/or at different times in the methods.

Figure 4:
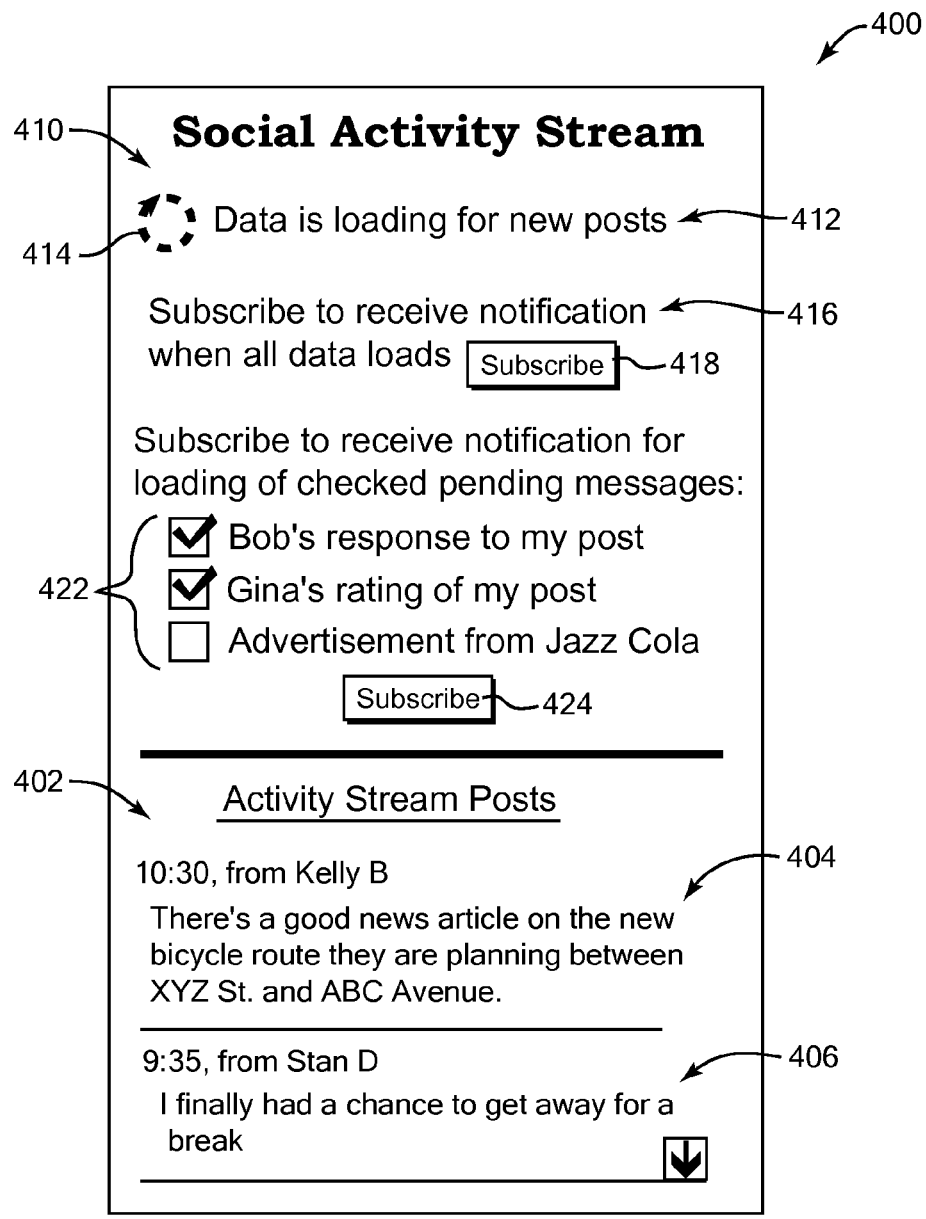
FIGS. 4 and 5 are illustrations of a simplified interface displayed by a user device and including example notifications and preferences pertaining to low-bandwidth features described herein, according to some implementations.

FIG. 4 is a diagrammatic illustration of a simplified interface 400 displayed by a display of a user device and displaying example information based on one or more features described in the methods of FIG. 2 and/or FIG. 3, according to some implementations. Interface 400 can be displayed, for example, on a display (flatscreen, touchscreen, etc.), e.g., of a client device 120, 122, 124, and/or 126 of FIG. 1 or a server system 102 in some implementations. In some examples, the interface 400 can display information for display on a screen of a client device, where the information is determined or derived locally at the device and/or is received from the server system 102 via a network. In the present example, a device is displaying information by an operating system or application implemented on the device and related to transmitting information during low service conditions.

The example interface 400 provides information messages transmitted from other entities connected to the network. In this example, the information messages are provided in a social activity stream of data from a social networking service and system. The activity stream of the user of the device on the social networking service can be a series of information messages such as postings of content, ratings, or other information from other users of the social networking service as well as the user's own such postings. Other users whose postings are shown in the activity stream can be included in the device user's user groups, and/or can be specially designated to be users from which the device user wishes to see postings and comments. Each user of the social networking system can similarly designate a subset of users whose postings will appear in that user's activity stream. In some examples, any of the users of the social networking service who can read a posting can post feedback to that posting, such as comments on a posting, ratings that indicate the user approves or likes the posting (or does not), answer or other feedback to the postings, etc. Any type of media content can be posted, such as text, images, audio sequences, video sequences, etc.

The interface 400 can provide the device user's activity stream to the display of the device. For example, the user's own postings as well as postings from selected users can be received from the social networking service and displayed on the display screen of the device. An example of such postings previously received over the network from the social networking system can be provided in a posting area 402 of the interface 400. In this example, a posting 404 is provided from a user Kelly B of the social networking service, and an earlier posting 406 is provided from another user Stan D. The device user's own previous postings can also be displayed in posting area 402.

In the present example, interface 400 also displays a low-service information area 410 of the interface 400. Low-service area 410 can be displayed in response to the device having determined that a low-bandwidth threshold has been satisfied and that low bandwidth service currently exists between the user device and the data network used by the device to send and receive data, and that delays are occurring in transmission of data. In some implementations, the low service area 410 can be displayed if the device has determined that a future low-bandwidth threshold will likely be satisfied and a low-bandwidth threshold condition will likely exist, e.g., within a predetermined time period from the current time. An indication is displayed to the user to inform the user that such delays are present (or will likely be present) for the device. In this example, indicator 412 informs the user that information messages are loading and being received for new posts that have been input to the social networking service by other users, where the new posts have not yet been received and displayed by the device. An indication can be shown for outgoing messages that are still be transmitted from the user device, if appropriate. In this example, an icon 414 can also be displayed to show that receiving of the post data is presently occurring over the network.

In some implementations, a subscribe notification 416 can be displayed to offer the user an opportunity to subscribe to a future notification that will be provided when the data has been loaded and is displayable. The subscribe notification includes a button 418 or other selection control allowing a user to subscribe to the future notification. The notification can be a visual, audio, tactile, etc. signal or alarm, for example. In some implementations, the output of the notification can indicate to the user that a message has been sent or received, a substantial portion thereof has been sent or received, or a sufficient amount of the data has been received for output of at least a portion of the message to the user (if appropriate). For example, the notification can be output even though all of the data has not yet been received, if at least some of the received information can be displayed or otherwise output.

Some implementations can provide a subscribe display area 420 of the interface 400 which allows the user more control as to the information messages the user is subscribing to receive a notification. In this example, three individual pending information messages 422 are listed as pending at the current time. The user can select as to which of the information messages he or she wishes to subscribe for future notification of transmission. The listed messages can be characterized or described in some implementations, e.g., to indicate whether a pending message is a response, rating, comment, or other feedback to one of the user's previous postings, a new post from a user, an advertisement, etc. Other types of information messages can also be indicated. For example, in some implementations, a communicating device can include information at the beginning of an information message transmission which indicates the type, sender, and/or other information related to that information message.

A subscribe button 424, when selected by the user, can allow the user to subscribe to a notification for those information messages 422 that the user has selected. In some implementations an individual notification can be output for each of the selected information messages 422, or in other implementations a single notification can be output after all the selected messages 422 have been transmitted.

In other implementations, additional information can be displayed in the interface 400, such as further characteristics about the transmitting entity and/or networked device. Furthermore, the user can subscribe to be notified as to when his or her own messages have been finished being sent from the user device to the network and/or have been received by the intended recipient(s). For example, a notification 412 can indicate that data is in the process of or pending being sent from the user device, and the user's sent information message can be listed in the messages 422 for subscription. Other implementations can display similar interface features for other types of information messages, including information being transmitted to a website, email, data related to downloads, uploads, or an ongoing process running on the device e.g. a game, status updates for game scores, stocks, etc.).

Figure 5:
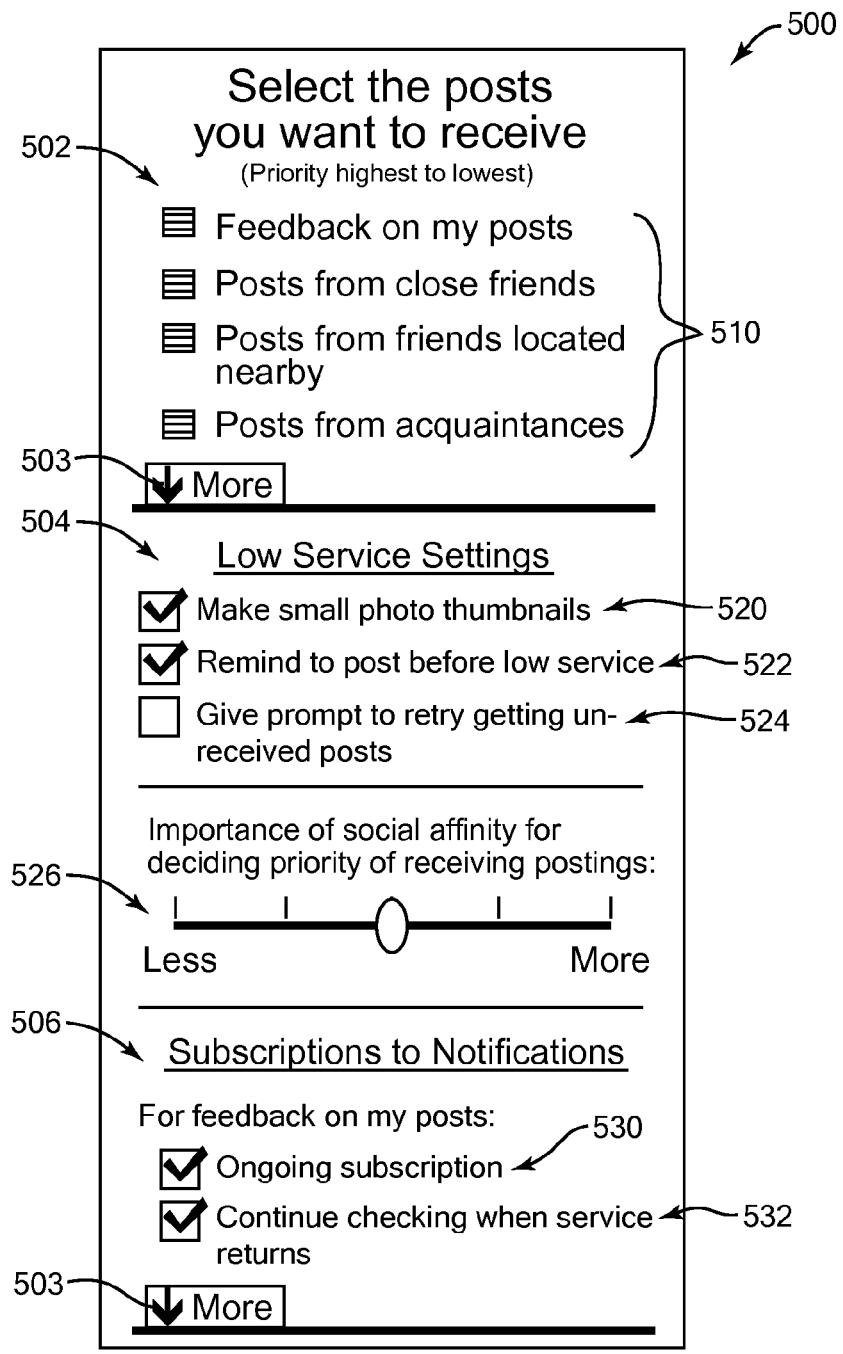

FIG. 5 is a diagrammatic illustration of another example simplified interface 500 displayed by a display of a user device and including examples of user settings which can influence one or more low-service features described herein, according to some implementations. Interface 500 can be displayed and implemented similar to interface 400 of FIG.

4. In the example of FIG. 5, the interface 500 can include a number of different display areas, including a priority list display area 502, a general settings display area 504, and a subscription settings display area 506. In some implementations, the interface 500 can be scrolled vertically, and/or any display area can be expanded to display more information if the user selects a control such as an expand button 503. Settings such as those shown in FIG. 5 can be stored on the device and/or can be stored over a network on a server device.

Interface 500 can include a priority list display area 502 which can be used to display and offer options for a list of message priorities. For example, different types of messages can be assigned different priorities as to the importance of the messages being transmitted during an occurrence of bandwidth under the low bandwidth threshold, as described above with reference to FIG. 3. In some examples, the priority list display area 502 can display a list of different message types 510. In some implementations, the order of displayed message types can be displayed in a top-to-bottom order indicating highest priority to lowest priority. Thus, in the example of FIG. 5, feedback on the user's posts has the highest priority, posts from close friends have the next highest priority, and so on. In some implementations, the user can rearrange the displayed list as desired to rearrange the priorities of items, and/or can add new message types and can assign priorities to those types by placing the new types within an appropriate place in the order. Other implementations can indicate message type priority in other ways, such as displaying a priority indicator next to a message type, e.g., a priority number, color-coded priority etc.

In the general settings display area 504, the user device can display various settings allowing the user to select and/or modify user preferences for the behavior of information message transmission during a low-bandwidth threshold condition (e.g., "low service" in some implementations, including "no service"). In the example shown, a thumbnail setting 520 is provided to allow the user to select that images in received messages are displayed in smaller form having less data, thus allowing the images to be displayed faster without having to wait for all the data of the normal, larger-sized image to be received. A reminder setting 522 allows the user to select whether the device will provide a reminder to the user at a predetermined time (optionally user-settable time) before a period when the device has determined or predicted that a low-bandwidth threshold condition is likely to occur. Such a reminder can be used, for example, to remind the user to send out any desired messages soon after the reminder, so that the messages can be sent during higher bandwidth conditions before a low-bandwidth threshold condition occurs. A retry setting 524 can allow the user to select that the device will provide a prompt to the user to retry communicating messages that were attempted to be transmitted (e.g., received or sent by the user device) but were not able to be transmitted during the low bandwidth threshold condition. For example, if during the low-bandwidth threshold condition the device was not able to receive a posting from a friend, and/or the device excluded a low-priority message from being received, the prompt could allow the user to select whether the device should retry receiving those un-received messages. This prompt can be provided during the low-bandwidth threshold condition, e.g., a predetermined time after attempting and failing to transmit a message, and/or can be provided after the low-bandwidth threshold condition is over. Various other options related to the low-bandwidth operation of the device can be presented to the user in some implementations.

Some implementations can provide options for the user to select the desired importance of various message characteristics in deciding priority of the messages. In an example of FIG. 5, a slider 526 is displayed, which the user can select to adjust the slider to a position on the horizontal scale. Positioning the slider closer to the left side of the range causes social relationships to be less important in deciding the priority of transmitting messages during low-bandwidth threshold conditions, and positioning the slider closer to the right side causes social relationships to be more important. In some implementations, the social relationships can be social affinity that indicates how close or strong of a social relationship that the user has with the communicating entity. The social relationship (such as social affinity) can be determined based on one or more factors, such as whether the entity is within a friends or family user group of the device user on a social networking service, indicating a strong social relationship. In some implementations, user groups can be predetermined by the user and/or a social networking service to have various social relationship or affinity scores associated with them to indicate the social affinity to the user. Another factor can be based on whether the user sends many messages to an entity, and/or receives many messages from the entity, where the greater the number the messages the stronger a social relationship is indicated. The number of messages needed to receive a "close" relationship status can be predetermined as one or more thresholds, for example.

The position of the slider 526 can be used to indicate how much weight is afforded to the social relationship between user and entity in determining a priority of a message during a low-bandwidth threshold condition. The greater the weight, the more priority is afforded to messages associated with an entity having a close social relationship with the user. If the user does not want to emphasize social relationships, then the slider can be moved to the left in the example of FIG. 5. In some implementations, the order of priority indicated in priority list area 502 can override any setting provided on slider 526 for types of information messages explicitly listed in the priority list area, and types of messages not listed in the area 502 can be controlled by slider 526. Some implementations can allow a user to indicate that the slider 526 is to be used for all information messages, or for a user-designated subset of message types.

Subscription settings 506 can allow a user to customize features for subscribing to notifications related to low bandwidth conditions. Some examples shown in FIG. 5 include options relate to a particular type of information message, such as feedback messages made in response to one or more of the user's provided messages. For example, option 530 allows a user to select an ongoing subscription to notifications for all feedback to the user's messages. Thus, for example, each time a response to the user's post on a social networking site or other online site is received at the device, the user would get a notification of the completed loading of the response, rather than providing a prompt to subscribe to each individual loading message. An option 532 allows a user to instruct the device to continue checking if a low-bandwidth threshold condition ends and to provide a notification on the device when the condition has ended. This allows a user to know when the low-bandwidth threshold condition ends without having to repeatedly check the device manually.

Other implementations can provide other settings for customization of low bandwidth operation of the device.

Figure 6:
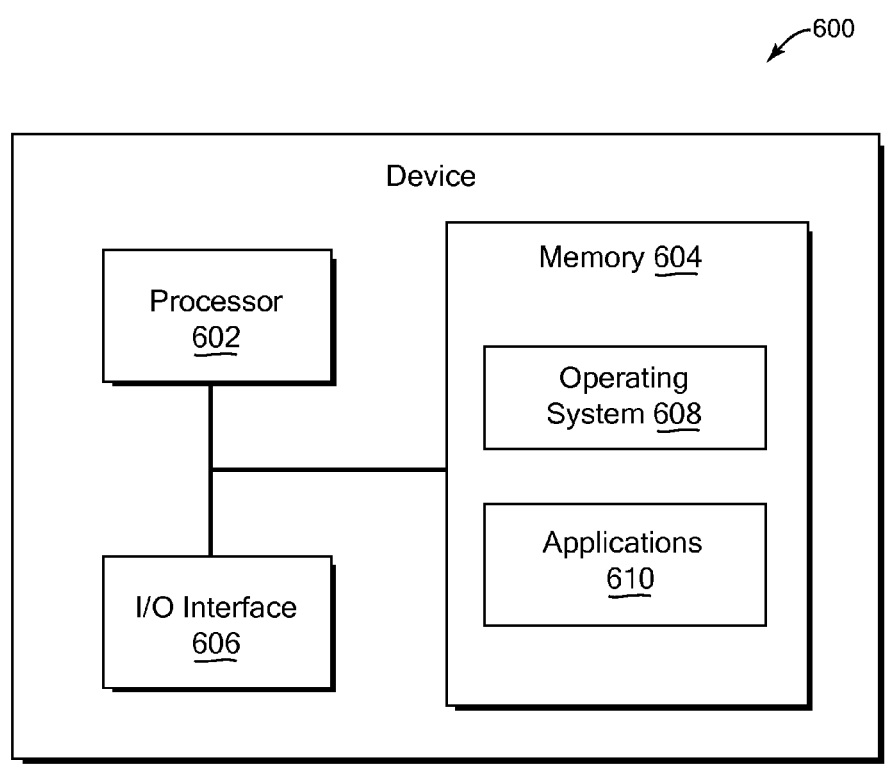
FIG. 6 is a block diagram of an example device which may be used for one or more implementations described herein.

FIG. 6 is a block diagram of an example device 600, which may be used to implement some implementations described herein. For example, device 600 can be used to implement any of client devices 120-126 shown in FIG. 1, and perform appropriate method implementations described herein. Device 600 can be any suitable computer system, server, or other electronic or hardware device. For example, the device 600 can be a portable computer, mainframe computer, desktop computer, workstation, or any other electronic device (portable device, cell phone, smart phone, tablet computer, head-mounted display device, television, TV set top box, personal digital assistant (PDA), media player, game device, etc.). In some implementations, device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the device 600 by the processor 602, including an operating system 608 and one or more application engines 610 including client group communication application software. In some implementations, the application engine 610 can include instructions that enable processor 602 to perform the functions described herein, e.g., some or all of the methods of FIGS. 2 and 3. Any of software in memory 604 can alternatively be stored on any other suitable storage location or computer-readable medium. In addition, memory 604 (and/or other connected storage device(s)) can store privacy settings, content, and other data used in the features described herein. Memory 604 and any other type of storage (magnetic disk, optical disk, magnetic tape, or other tangible media) can be considered "storage devices."

I/O interface 606 can provide functions to enable interfacing the device 600 with other systems and devices. For example, network communication devices, storage devices such as memory and/or database 106, and input/output devices can communicate via interface 606. In some implementations, the I/O interface can connect to interface devices such as input devices (touchscreen, keyboard or keypad, pointing device, microphone, camera, scanner, etc.) and output devices (display screen or other display device, audio speaker devices, printer, motor or other actuator, etc.). A display device, for example, can be used to display the settings, notifications, and/or other features as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions, and/or an actuator for outputting vibration or other forces.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, server device 600 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A server device can also implement and/or be used with one or more features described herein. Some example server devices are described with reference to FIG. 1 and can include one or more components of the device 600, such as processor(s) 602, memory 604, and I/O interface 606. An operating system, software and applications suitable for the server device can be provided in memory and used by the processor, such as a web hosting engine and/or social networking engine. The I/O interface for a client device can be connected to network communication devices, as well as to input and output devices.

Although the description has been described with respect to particular implementations thereof, these particular implementations are merely illustrative, and not restrictive. Concepts illustrated in the examples may be applied to other examples and implementations.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   determining that one or more information messages from one or more entities are being received by a user device over a network;
   determining that a bandwidth on the network satisfies a low-bandwidth threshold;
   providing a notification to the user device to indicate the determination that the bandwidth satisfies the low-bandwidth threshold; and
   in response to determining that the bandwidth satisfies the low-bandwidth threshold, modifying transmission of the one or more information messages based on priorities assigned to the one or more information messages, wherein the priorities are based on:
one or more social relationships between a user associated with the user device and the one or more entities, and
a respective geographic distance between the one or more entities and the user device.

2. The method of claim 1 wherein modifying the transmission of the information messages includes determining an order of transmitting the one or more information messages based on the relative priorities of the information messages; and
modifying transmission of the information messages includes adjusting an amount of time used in one or more attempts to transmit at least one of the one or more information messages, wherein the amount of time is based on the one or more social relationships.

3. The method of claim 1 wherein determining that the bandwidth on the network satisfies a low-bandwidth threshold includes determining that a future bandwidth on the network will satisfy the low-bandwidth threshold based on at least one of:
a number of persons predicted to be present at a predicted location of the user device at the time of the future bandwidth; and
a history of bandwidth conditions at the predicted location of the user device at the time of the future bandwidth.

4. The method of claim 1 further comprising providing a prompt to the user device to subscribe to receive a future notification that will be output by the user device to indicate that at least one of the one or more information messages of a specified type has been transmitted.

5. A method comprising:
determining that a bandwidth on a network satisfies or will satisfy a low-bandwidth threshold and restricts or will restrict transmission of one or more information messages between a user device and one or more entities associated with the one or more information messages; and
in response to determining that the bandwidth satisfies or will satisfy the low-bandwidth threshold, modifying transmission of the one or more information messages between the user device and the one or more entities, wherein the modifying is based on:
one or more social relationships between a user associated with the user device and the one or more entities, and
a respective geographic distance between the one or more entities and the user device.

6. The method of claim 5 wherein modifying the transmission of the information messages includes:
determining a priority for each information message based on the one or more social relationships and the respective geographic distance, and also based on at least one of:
excluding from transmission a subset of the one or more information messages having lowest priorities; and
determining an order of transmitting the one or more information messages based on the relative priorities of the one or more information messages.

7. The method of claim 5 wherein modifying the transmission of the information messages includes:
determining that the bandwidth on the network satisfies or will satisfy a low-bandwidth threshold includes determining that a future bandwidth on the network will satisfy the low-bandwidth threshold based on at least one of:
a number of persons predicted to be present at a predicted location of the user device at the time of the future bandwidth; and
a history of bandwidth conditions at the predicted location of the user device at the time of the future bandwidth.

8. The method of claim 6 wherein determining a priority for each information message is also based on whether that information message is a response to a one or more previous particular information messages provided by the user over the network.

9. The method of claim 6 wherein determining a priority for each information message is also based on a geographical location of a source of each information message.

10. The method of claim 5 wherein the one or more entities include a plurality of source entities, wherein the user device is operative to receive the one or more information messages from each source entity.

11. The method of claim 5 wherein the one or more entities include one or more target entities, wherein the user device is operative to send each target entity one or more information messages.

12. The method of claim 5 wherein modifying transmission of the information messages includes adjusting an amount of time used in one or more attempts to send or receive at least one of the one or more information messages, wherein the amount of time is based on the one or more social relationships and is based on a geographic location of the user device.

13. The method of claim 5 wherein the one or more entities include one or more users of a social networking service that is used by the user of the user device, and wherein the social relationships are determined based on data from the social networking service.

14. The method of claim 5 further comprising providing a notification output by the user device to indicate the determination that the bandwidth satisfies or will satisfy the low-bandwidth threshold, and providing a prompt output by the user device to subscribe to receive a future notification that indicates that at least a substantial portion of at least one of the information messages has been transmitted.

15. The method of claim 5 further comprising scheduling a transmission of at least one of the one or more information messages between the user device and the network at a time prior to a future time when it is known that the low-bandwidth threshold is likely to be satisfied on the network.

16. The method of claim 15 wherein the time that the low-bandwidth threshold is likely to be satisfied is known based on an accessible calendar of the user indicating events or locations to be attended by the user, and indicating associated times with the events or locations.

17. A device comprising:
a storage component; and
at least one processor accessing the storage component and operative to perform operations comprising:
determining that a bandwidth on a network satisfies or will satisfy a low-bandwidth threshold, wherein the bandwidth restricts or will restrict transmission of one or more information messages between a user device and one or more entities over the network; and
in response to determining that the bandwidth satisfies or will satisfy the low-bandwidth threshold, modifying transmission of the one or more information messages between the user device and the one or more entities, wherein the modifying is based on:

one or more social relationships between a user associated with the user device and the one or more entities associated with the one or more information messages, and a respective geographical location of a source of each of the one or more information messages.

18. The device of claim 17 wherein the operation of modifying transmission is also based on a respective geographic distance between the one or more entities and the user device.

19. The device of claim 17 wherein the operation of modifying transmission is also based on whether each particular information message is a response to one or more previous particular information messages provided by the user over the network.

20. The device of claim 17 wherein the at least one processor is operative to perform an operation comprising providing a prompt to the user device to subscribe to receive a future notification that will be output by the user device to indicate that at least one of the one or more information messages of a specified type has been transmitted.

* * * * *